Aug. 28, 1945.  A. B. ATKINSON  2,383,699
SOLDERING IRON
Filed Sept. 16, 1944
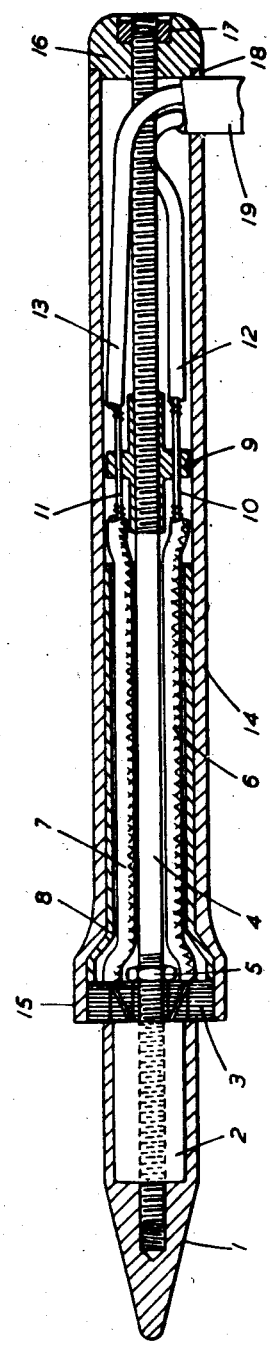
Inventor
Alan Baxter Atkinson.
By
Attorney Patented Aug. 28, 1945

2,383,699

UNITED STATES PATENT OFFICE 2,383,699

SOLDERING IRON

Alan Baxter Atkinson, London, England, assignor to Standard Telephones and Cables Limited, London, England, a British company Application September 16, 1944, Serial No. 554,391
In Great Britain September 3, 1943

2 Claims. (Cl. 219—26)

The present invention relates to soldering irons, and its principal object is to provide a very small preferably electric soldering tool suitable for fine instrument work.

An electric soldering iron according to the invention may, for example, be under seven inches long and about half an inch in diameter, closely resembling a rather thick pencil. In designing such a tool, considerable difficulties are encountered owing to the necessity for providing that the temperature of the copper bit shall be the same as in a heavy duty iron, namely 360° to 370° C., while at the same time keeping the tool sufficiently small and light to enable it to be easily controlled and handled in view of the fine work which has to be done, often in a confined space; and also making it possible for it to be held just like a pencil rather close to the bit.

In any ordinary design, these requirements would impose a temperature gradient of something like 1600° C. per inch in the insulating material of the handle, and it has been found that in any known insulating material, the heat transfor through the available surface area is insufficient to maintain such a temperature gradient, and the handle becomes too hot. The difficulties have been completely overcome by the means explained below, and the features of the invention are set out as the appended claims.

An embodiment of the invention illustrated in the accompanying drawing will now be described.

The figure of the drawing shows a longitudinal section through an electric soldering iron. The construction will be most easily understood by describing the manner in which the parts are put together. The copper bit 1 is of conventional conical form, and circular in section. The heating coil (not shown) is placed inside the internal cavity 2 of the bit. The cavity is closed by the electrically insulating disc 3, which should have good heat insulating properties, and is made preferably of laminated mica, or a moulding of glass-bonded mica. The heating coil and disc 3 are fixed in position by the long threaded rod 4 screwed into the bit 1, and by the nut 5. The rod and nut may be of steel, for example.

The leads to the heating coil pass through holes in the disc 3 and are connected to insulated leads 6 and 7 arranged inside a relatively long metal tube 8 of copper or other metal or material having a high heat conductivity, the enlarged end of which abuts against the disc 3. A connector 9 preferably of mouldable insulating material (such as hard rubber or phenol condensation products or the like) is screwed on to the free end of the rod 4, and carries pins 10 and 11 moulded therein, to which the internal leads 6 and 7 are respectively connected. The external leads 12 and 13 are connected to the other ends of the pins.

A handle 14 preferably of mouldable insulating material is slipped over the copper tube 8 which it fits snugly, and has a corresponding enlarged portion 15 which slips over the disc 3 and retains the copper tube in position against the disc. A plug 16 of insulating material closes the end of the handle, and the whole assembly is fixed together by the nut 17 located in a recess in the plug 16 and screwed to the end of the rod 4. A slot 18 is provided in the handle to enable the external cable 19 to pass out.

The maintenance of the necessary high temperature gradient between the bit and the outer surface of the handle is ensured by the combined actions of the disc 3 and the copper tube 8. As a result of the high heat conductivity of the tube, the heat which is transmitted through the disc is rapidly conducted or shunted away from it and from the front end of the handle, and is thereby distributed over a large area from which the necessary amount of heat energy may be dissipated at a relatively low temperature which is very nearly constant over the whole area of the tube. The end of the handle near the bit therefore does not become too hot to hold.

The construction of the soldering iron, while meeting the requirements of heat dissipation, has also been designed with a view to simplicity of manufacture. There are no parts which are difficult to make or require close limits as to the dimensions, and the use of mouldable parts such as 9, 14 and 16, is conducive to cheapness. The assembly process as described is relatively simple and quickly carried out.

Electric soldering irons for instrument work which can be held near the bit somewhat in the manner of the embodiment described, have been previously designed. In one such form, the tool is similar to the conventional pattern in that the bit is connected to a handle portion by a relatively long shank. A bell-shaped skirt or sleeve of ceramic or similar material surrounding the shank forms a downward extension of the handle by which the tool may be held low down near the bit. However, in order to prevent the sleeve from getting too hot, its diameter must be relatively large and the resulting tool is rather clumsy and is not suitable where the working space is confined.

It will be clear that in the present invention the heat is disposed of in an entirely different way. The copper sleeve acts as a heat shunt and conducts the heat away from the end of the handle and distributes it over a large area, so that the energy is dissipated at a low temperature. Thus no part of the handle becomes very hot. This enables the diameter of the handle to be made small and allows the bit to be fixed practically directly to the lower end without any intervening shank, which shank is characteristic of practically every known form of soldering iron.

It will be obvious that the principle of the invention is directly applicable to soldering irons in which the bit is heated in any other manner than by electricity, either internally or externally; for example, by simply omitting the heating coil and leads, the tool illustrated in the drawing would be suitable for use where the bit is heated by an external gas or other flame according to common practice when an electric supply is not available, and the handle would remain cool enough for use for the reasons explained.

What is claimed is:

1. A soldering iron comprising a handle of insulating material formed as a tubular body of relatively small cross-section having a flared marginal end portion, an insulating disc fitted within the marginal end portion of the body, a soldering bit having a recessed rearward portion and a threaded internal bore, a heat distributing sleeve member of high conductivity metal fitting within the forward portion of the handle and formed with a flared end portion bearing on the flared portion of the handle and having the body thereof extended within the handle for heat dissipation over an extended area thereof, a clamping bolt extending longitudinally through the handle with threaded engagement with the bit and provided with a clamping shoulder engaging the disc, an adjustable terminal member threaded on the outer end portion of the bolt and positioned within the handle, a clamping member secured to the outer end of the bolt in engagement with the handle for the clamping of the parts, an electrical resistance heating element within the bit recess and connecting leads thereof connected to the terminal member.

2. A soldering iron comprising a handle of insulating material formed as a cylindrical body of relatively small diameter having a flared marginal end portion, an insulating disc fitted with the marginal end portion of the body, a soldering bit having a recessed rearward portion and a threaded internal bore, a heat distributing sleeve member of high conductivity metal fitting within the forward portion of the handle and formed with a flared end portion bearing on the flared portion of the handle and having the body thereof extended within the handle for heat dissipation over an extended area thereof, a clamping element bearing on the end of the handle opposite that of the bit, a clamping bolt extending longitudinally through the handle with threaded engagement with the bit and with the clamping member for the clamping of the bit against the disc and the disc against the sleeve member, an electrical resistance heating element within the bit recess and connecting leads thereto passing through the handle and disc members.

ALAN BAXTER ATKINSON.